H. R. VAN VLECK.
VALVE GEAR FOR ENGINES.
APPLICATION FILED OCT. 30, 1914.

1,193,207.

Patented Aug. 1, 1916.
2 SHEETS—SHEET 1.

WITNESSES:

INVENTOR
H. R. Van Vleck
BY
ATTORNEYS

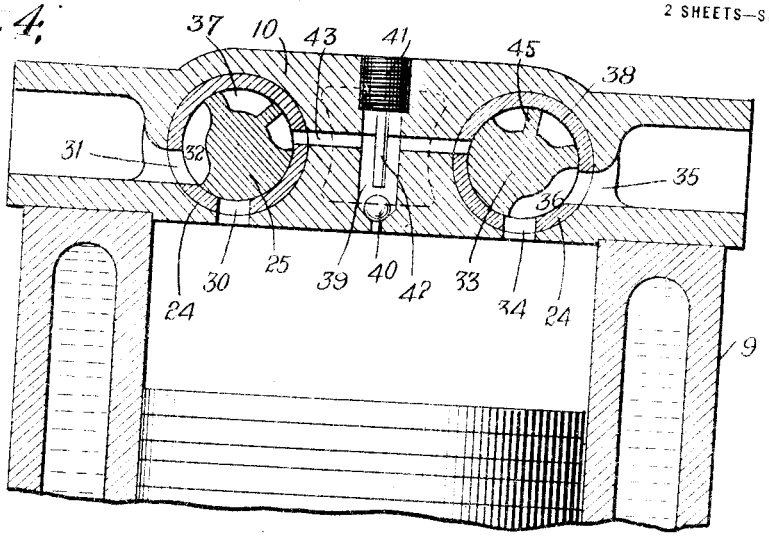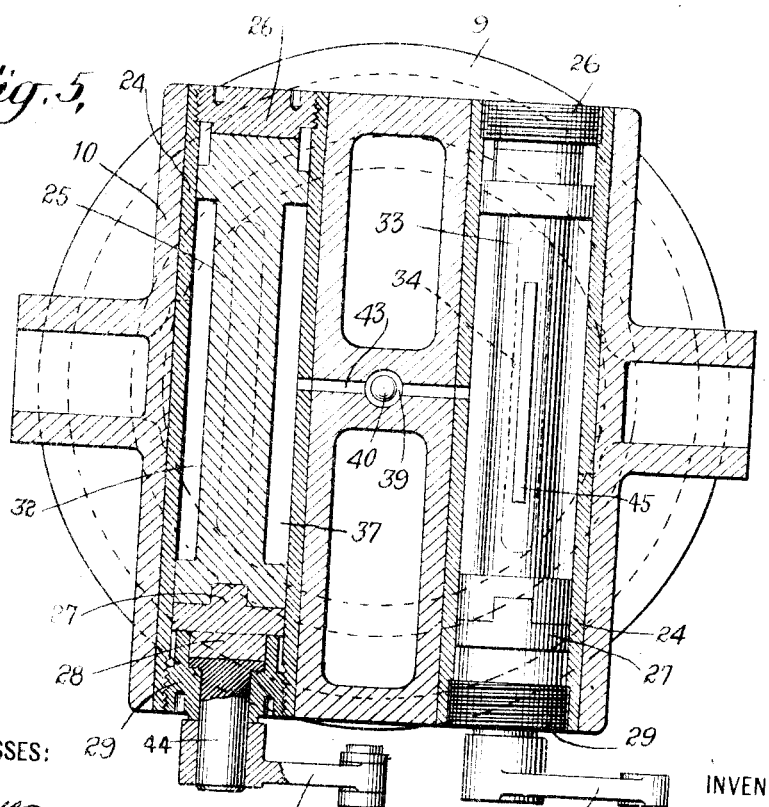

UNITED STATES PATENT OFFICE.

HORACE RUSS VAN VLECK, OF MONTCLAIR, NEW JERSEY.

VALVE-GEAR FOR ENGINES.

1,193,207.  Specification of Letters Patent.  Patented Aug. 1, 1916.

Application filed October 30, 1914. Serial No. 869,354.

*To all whom it may concern:*

Be it known that I, HORACE RUSS VAN VLECK, a citizen of the United States, residing in the city of Montclair, county of Essex, and State of New Jersey, have invented certain new and useful Improvements in Valve-Gear for Engines; and I do hereby declare the following to be a full, clear, and exact description of the invention, such as will enable others skilled in the art to which it appertains to make and use the same.

This invention relates to valve gear for engines of the type employing one or more valve-members which are turned about an axis in accordance with the rotation of the engine shaft.

The invention may be utilized in the valve gear of engines of various types, but it is of special utility in internal explosion engines of the type employing valves which are given an oscillating rotational movement in accordance with the rotation of the engine shaft.

In engine valve gears of the type employing rotary valve-members, it is important that the valve-member be held upon its seat with the requisite degree of pressure so as to prevent leakage. In order to accomplish this, it has been proposed heretofore to utilize the pressure within the cylinder of the engine in subjecting the valve to pressure.

The present invention is directed to the provision of a valve gear in which the cylinder pressure is utilized to press the valve or valves against their seats, this being of an improved construction whereby better results are obtained in the operation of the engine. In accordance with the invention, the cylinder pressure is caused to be exerted upon the valve-member or members in such a way as to make the pressure thereon continuous throughout the operation of the engine. The degree of this pressure may be regulated as desired by regulating the area of the valve-member which is subjected to the cylinder pressure and also the area of the member which is in engagement with the seat of the valve.

I have illustrated the preferred embodiment of my invention in the accompanying drawings, in which—

Figure 1:
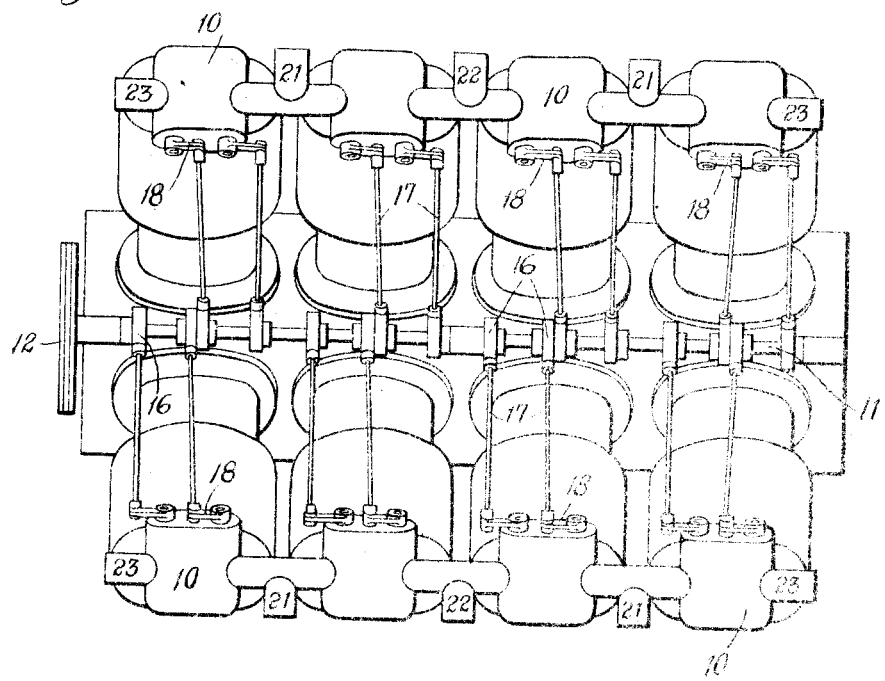
Figure 2:
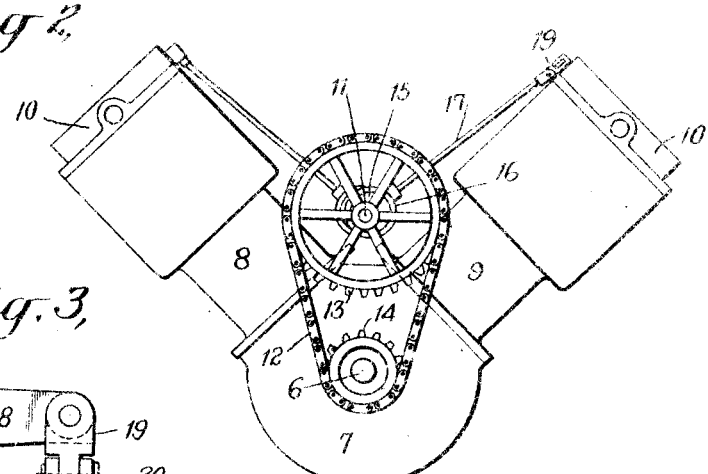
Figure 3:
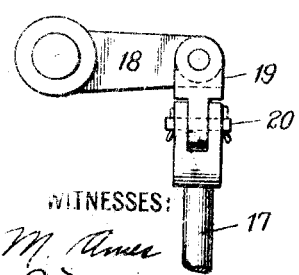

Figure 1 is a plan view of a gas engine having my improved valve gear applied thereto; Fig. 2 is an end view of the engine; Fig. 3 is a detail view of a portion of the mechanism for oscillating one of the valves; Fig. 4 is a longitudinal section through the upper portion of one of the cylinders, and Fig. 5 is a horizontal section through the valve-members of one of the cylinders.

In the drawings I have shown my invention as embodied in a gas engine having eight cylinders which are arranged in two rows of four each, the two rows being so set that one is disposed at an angle of ninety degrees to the other about the axis of the engine shaft. The shaft is shown at 6, it being mounted for rotation in bearings provided for its reception in the crank case 7. The cylinders 8 and 9 of the two rows are bolted or otherwise secured to the case 7 in the usual manner. Each of the cylinders has a head 10 in which the valves are mounted. These valves are of cylindrical form and they extend across the ends of the cylinders. At one end each of the valves is extended through the casing to provide means for the attachment of operating mechanism by which the valve is given an oscillating rotational movement. This movement of the valves is effected by a shaft 11 which is driven by the engine shaft 6. In the case of a four-cycle internal combustion engine, the shaft 11 is so geared to the shaft 6 as to cause it to make one revolution for each two revolutions of the engine shaft. In the present instance this is shown as effected by a chain 12 running on sprockets 13 and 14 secured to the shafts 11 and 6 respectively. The shaft 11 is shown as provided with a plurality of eccentrics 15, two for each cylinder, each of which is connected to and adapted to actuate one of the valves. As shown, each eccentric 15 has an eccentric strap 16 thereon to which a rod 17 is connected. The opposite end of the rod 17 is connected to the corresponding valve through a universal joint. Preferably the construction shown in Fig. 3 is utilized. The valve has a crank 18 secured to the end thereof and the end of this crank has a block 19 pivotally connected thereto. The upper end of rod 17 is connected to the block 19 by a pivot 20 extending in a direction transverse to the pivot connecting the block 19 and crank 18.

The two pairs of cylinders in each row of four cylinders preferably have their inlet valves adjacent so that a single conduit will supply the inlet valves of the two cylinders. Four inlet conduits 21, therefore, supply the inlet valves of the eight cylinders and the two conduits 21 on each side of the engine are preferably connected together. The exhaust valves of the two cylinders at the middle of each row of four cylinders are connected together and to a common exhaust conduit as shown at 22. The exhaust outlets 23 of the other four cylinders are connected to the main exhaust passage in any suitable manner.

Referring more particularly to Figs. 4 and 5, the construction of the valve-members and the casings therefor will now be described. The casting 10, forming the head of the cylinder, is provided with two cylindrical openings extending therethrough and in each of these openings is a sleeve 24. The valve-member 25 fits within the sleeve 24 and its ends are circular and of such size as to fit snugly within the sleeve 24. At one end, the sleeve is closed by a plug 26 threaded into the end of the sleeve and engaging the end of the valve-member 25. At its opposite end the member 25 has a transverse slot which receives a tenon 27 upon the end of a coupling block 28. On the other end of this block is a tenon adapted to effect connection between the valve-member 25 and an oscillating member 44 which is rocked by the crank 18 disposed at a right angle to the tenon 27 and entering a groove in a member 44 to which the crank 18 is secured. The member 44 extends through a collar 29 which is threaded into the end of tube 24 and serves to hold the valve-member, the coupling and the port 44 in position. In the casting 10 and the sleeve 24 are openings 30 forming a passage for the exhaust gases from the cylinder. Also similar openings are provided as shown at 31, forming a passage by which the exhaust gases flow from the valve to the exhaust conduit. These passages 30 and 31 are controlled by the valve-member 25 which is cut away on one side so as to provide the space 32, which will serve to connect the ports 30 and 31. It will be seen that when a valve-member 25 is turned on its axis in a counter-clockwise direction from the position in which it is shown in Fig. 4, the ports 30 and 31 will be bridged by the space 32 so as to provide an unobstructed passage for the exhaust gases from the interior of the cylinder through port 30, space 32 and port 31 to the exhaust. At the opposite side of the head of the cylinder is a similar valve structure including a valve-member 33 controlling a port 34 leading to the interior of the cylinder and a port 35 connected to the inlet conduit. The valve-member 33 is cut away on one side to provide a space 36 which, when the valve-member is in the position shown in Fig. 4, provides a passage for the inlet of the combustible mixture. The rocking of the valve-members 25 and 33 by the mechanism above described, carries those members to positions for closing the passages for the inlet of the combustible mixture and the outlet of the exhaust gases, the valve-member 25 being shown in Fig. 4 in the position in which the outlet passage is closed.

Each of the valve-members 25 and 33 is cut away on the side thereof opposite the port leading to the interior of the cylinder, as is shown at 37 and 38. In this way chambers are provided for the reception of a fluid under pressure, which serves to press the valve-members against their seats. These chambers 37 and 38 are connected together and to the interior of the cylinder, for which purpose a passage is provided extending through the casting 10 as shown at 39. At one point this passage is enlarged in diameter so as to form a seat for a valve 40. This valve is preferably a ball resting by gravity upon its seat and constitutes an automatic check-valve allowing the free passage of the pressure fluid from the cylinder through the passage 39 to chambers 37 and 38, while restricting the flow of the fluid in the opposite direction. The upper end of the passage 39 is closed by a threaded plug 41, preferably provided with a pin 42 serving to limit the upward movement of the ball valve 40. The passage 39 is connected by the transverse passage 43 with the chambers 37 and 38.

In the operation of the engine the air or other fluid in the chambers 37 and 38 and the passages 43 and 39 will be maintained continuously at a pressure substantially the same as the explosion pressure within the cylinder. It is probable that prior to the first explosion these spaces would become filled with the combustible mixture which would later be ignited. But whether or not the high pressure within the spaces 37, 38, 39 and 43 resulted from actual explosion therein or from the compression of the fluid therein as a consequence of the high explosion pressure within the cylinder, the desired high pressure within the chambers 37 and 38 would prevail throughout the period of operation of the engine with substantial uniformity. Any falling off in this pressure would result in the valve 40 being raised from its seat by the cylinder pressure to admit a further supply of fluid from the cylinder and immediately upon the pressure within the cylinder declining, the valve 40 would fall to its seat to prevent the escape of the fluid under pressure in the chambers 37 and 38. The pressure in the chambers 37 and 38 causes the valve-members 25 and 33 to be forced outwardly upon their seats and held against their seats with a substantially uniform pressure and a pressure great enough to insure the prevention of leakage through the valve. The degree of the pressure of the valves upon their seats may be regulated as desired by varying the area of the members 25 and 33 exposed to the pressure existing within the chambers 37 and 38 and the area of the valves in contact with their seats. By properly dimensioning these parts, the valves may be caused to be pressed against their seats with a degree of pressure which best conduces to smooth operation of the engine with substantially complete freedom from leakage at the valves.

The passages 43 may be so shaped that they are at all times in communication with the chambers 37 and 38 but this is not important. As shown in Fig. 4, the valves cut off communication from passages 43 to chambers 37 and 38 momentarily in each complete reciprocation but the pressure remains uniform in the spaces 39, 43, 37 and 38. If desired, a wall 45 may be provided at about the middle of each chamber 37 and 38, though not extending to the ends thereof, this wall being adapted to bear on the sleeve surrounding the valve-member.

What I claim is:

1. An engine having a cylinder, a piston therein, a shaft to which the piston is connected, a valve, means actuated by the shaft for turning the valve on an axis, a passage leading from the cylinder to the valve whereby the pressure developed in the cylinder is applied to the valve and a check device for maintaining the pressure to which the valve is thus subjected throughout changes in the pressure within the engine cylinder; substantially as set forth.

2. An engine having a cylinder, a piston therein, a shaft to which the piston is connected, a valve, means actuated by the shaft for turning the valve on an axis and automatic means depending upon the pressure within the cylinder for subjecting the valve to pressure which is continuous over a prescribed area of the valve and in a direction transverse to the axis about which the valve is turned, substantially as set forth.

3. An engine having a cylinder, a piston therein, a shaft to which the piston is connected, a valve, means actuated by the shaft for turning the valve on an axis, means for causing the pressure within the cylinder to be exerted upon the valve to hold the latter upon its seat and means for maintaining the pressure so produced, substantially as set forth.

4. An engine having a cylinder, a piston therein, a shaft to which the piston is connected, a valve, means actuated by the shaft for turning the valve on an axis, a passage leading from the interior of the cylinder to the valve for subjecting the valve to cylinder pressure to press it upon its seat and a check-valve in said passage for maintaining the pressure upon the valve, substantially as set forth.

5. An engine having a cylinder, a piston therein, a shaft to which the piston is connected, a valve, means actuated by the shaft for turning the valve on an axis, a port controlled by the valve, a pressure chamber on the side of the valve opposite said port, a passage leading from the cylinder to said chamber and an automatic check-valve in said passage, substantially as set forth.

In testimony whereof I affix my signature, in presence of two witnesses.

HORACE RUSS VAN VLECK.

Witnesses:
DEAN S. EDMONDS,
M. A. BILL.